US012348993B2

(12) United States Patent
Zec

(10) Patent No.: US 12,348,993 B2
(45) Date of Patent: Jul. 1, 2025

(54) GEOLOCATING MINIMIZATION OF DRIVE TEST (MDT) MEASUREMENT REPORTS (MRs) WITH MISSING SATELLITE NAVIGATION SYSTEM COORDINATES

(71) Applicant: Telefonaktiebolaget LM Ericsson (publ), Stockholm (SE)

(72) Inventor: Josko Zec, Tallahassee, FL (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 426 days.

(21) Appl. No.: 17/791,603

(22) PCT Filed: Mar. 13, 2020

(86) PCT No.: PCT/IB2020/052333
§ 371 (c)(1),
(2) Date: Jul. 8, 2022

(87) PCT Pub. No.: WO2021/181141
PCT Pub. Date: Sep. 16, 2021

(65) Prior Publication Data
US 2023/0037992 A1 Feb. 9, 2023

(51) Int. Cl.
*H04W 24/08* (2009.01)
*H04W 64/00* (2009.01)
(52) U.S. Cl.
CPC ......... *H04W 24/08* (2013.01); *H04W 64/003* (2013.01)
(58) Field of Classification Search
CPC ... H04W 24/08; H04W 64/003; H04W 16/18; H04W 64/00; H04W 24/02
See application file for complete search history.

(56) References Cited

U.S. PATENT DOCUMENTS 12,133,194 B2 * 10/2024 Bennett ............... H04W 64/003
2016/0021503 A1 1/2016 Tapia
(Continued)

FOREIGN PATENT DOCUMENTS

WO 2015135581 A1 9/2015
WO 2017139961 A1 8/2017

OTHER PUBLICATIONS

Author Unknown, "LTE_DL_Src (Downlink Baseband Signal Source)," ADS 2008 Update 2, edadocs.software.keysight.com/pages/viewpage.action?pageId=6089837, Keysight Technologies, 4 pages.
(Continued)

*Primary Examiner* — Julio R Perez
(74) *Attorney, Agent, or Firm* — Withrow & Terranova, PLLC

(57) ABSTRACT

Geolocating Minimization of Drive Test (MDT) measurement reports (MRs) with missing satellite navigation system coordinates is disclosed. In some embodiments, a computing node receives a plurality of complete MRs corresponding to a plurality of user equipments (UEs), wherein each complete MR comprises satellite navigation system coordinates identifying a geographic location of the corresponding UE. The computing node then trains a machine learning (ML) model for estimating UE geographic locations based on the plurality of complete MRs, wherein the ML model maps radio frequency (RF) signatures of complete MRs to corresponding UE geographic locations. In some embodiments, a radio access node obtains the ML model from the computing node, and receives an incomplete MR corresponding to a UE. Upon determining that the second MR lacks satellite navigation system coordinates, the radio access node predicts the geographic location of the UE based on measurements in the incomplete MR and the ML model.

18 Claims, 9 Drawing Sheets

(56) References Cited

U.S. PATENT DOCUMENTS

| | | | |
|---|---|---|---|
| 2023/0037992 A1* | 2/2023 | Zec | H04W 24/02 |
| 2023/0041036 A1* | 2/2023 | Park | H04W 16/20 |
| 2023/0289615 A1* | 9/2023 | Vandikas | G06F 21/6254 |
| 2023/0318749 A1* | 10/2023 | Lins De Medeiros | H04L 1/1896 370/329 |
| 2024/0147335 A1* | 5/2024 | Soryal | H04W 64/003 |
| 2024/0172165 A1* | 5/2024 | Hirzallah | H04B 17/391 |
| 2024/0259984 A1* | 8/2024 | Ghazvinian Zanjani | G06N 3/088 |
| 2024/0276420 A1* | 8/2024 | Hirzallah | H04W 64/00 |
| 2024/0296382 A1* | 9/2024 | Wang | G06N 5/022 |
| 2024/0298193 A1* | 9/2024 | Nie | H04W 24/02 |
| 2024/0323745 A1* | 9/2024 | Hirzallah | H04W 28/0215 |
| 2024/0340678 A1* | 10/2024 | Kollár et al. | H04W 76/20 |
| 2024/0340939 A1* | 10/2024 | Chang | H04W 24/02 |

OTHER PUBLICATIONS

Author Unknown, "Android v iOS market share," deviceatlas.com/blog/android-v-ios-market-share, Sep. 2019, DeviceAtlas Limited, 27 pages.

Author Unknown, "Technical Specification Group Radio Access Network; Evolved Universal Terrestrial Radio Access (E-UTRA); Physical layer; Measurements (Release 16)," Technical Specification 36.214, Version 16.0.0, Dec. 2019, 3GPP Organizational Partners, 26 pages.

Author Unknown, "Technical Specification Group Radio Access Network; Evolved Universal Terrestrial Radio Access (E-UTRA); Medium Access Control (MAC) protocol specification (Release 15)," Technical Specification 36.321, Version 15.8.0, Dec. 2019, 3GPP ORganizational Partners, 134 pages.

Author Unknown, "Technical Specification Group Radio Access Network; Evolved Universal Terrestrial Radio Access (E-UTRA); Radio Resource Control (RRC); Protocol specification (Release 15)," Technical Specification 36.331, Version 15.8.0, Dec. 2019, 3GPP Organizational Partners, 964 pages.

Author Unknown, "Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 14)," Technical Specification 37.320, Version 14.0.0, Mar. 2017, 3GPP Organizational Partners, 26 pages.

Barber, D., "Geolocation of WiMAX Subscriber Stations Based on the Timing Adjust Ranging Parameter," Thesis, Naval Postgraduate School, Dec. 2009, 5 pages.

Jarvis, et al., "Geolocation of LTE Subscriber Stations Based on the Timing Advance Ranging Parameter," Military Communications Conference, 2011, pp. 180-187.

Kanazawa, et al., "Field Experiment of Localization based on Machine Learning in LTE network," 88th Vehicular Technology Conference, Aug. 2018, IEEE, 6 pages.

Mondal, et al., "Performance Evaluation of MDT Assisted LTE RF Fingerprint Framework," International Conference on Mobile Computing and Ubiquitous Networking, 2014, pp. 33-37.

Roth, et al., "On Mobile Positioning Via Cellular Synchronization Assisted Refinement (CeSAR) in LTE and GSM Networks," 9th International Conference on Signal Processing and Communication Systems, Dec. 2015, IEEE, 8 pages.

Invitation to Pay Additional Fees and Partial Search for International Patent Application No. PCT/IB2020/052333, mailed Nov. 24, 2020, 15 pages.

International Search Report and Written Opinion for International Patent Application No. PCT/IB2020/052333, mailed Feb. 1, 2021, 20 pages.

* cited by examiner

GEOLOCATING MINIMIZATION OF DRIVE TEST (MDT) MEASUREMENT REPORTS (MRs) WITH MISSING SATELLITE NAVIGATION SYSTEM COORDINATES

This application is a 35 U.S.C. § 371 national phase filing of International Application No. PCT/IB2020/052333, filed Mar. 13, 2020, the disclosure of which is incorporated herein by reference in its entirety.

TECHNICAL FIELD

The present disclosure relates to techniques for geolocation of user equipment (UE) devices.

BACKGROUND

Cellular mobile radio communication networks are maintained and optimized by analyzing measurements collected from two primary sources: drive/walk tests and measurement reports (MRs). The drive/walk tests deploy test phones, scanners, and satellite navigation system receivers (e.g., Global Positioning Satellite (GPS) receivers, as a non-limiting example). Satellite navigation systems provide geographic coordinates that enable precise geolocation of drive/walk test measurements. MRs are transmitted by active User Equipments (UEs) (i.e., wireless mobile devices) to an Operations Support Subsystem (OSS) software platform of the cellular mobile radio communication network to monitor, control, analyze, and manage the network.

Different disadvantages are associated with each of these two measurement sources. For instance, drive/walk testing is a laborious and costly process that tends to be biased toward driven/walked routes, and consequently may not fully capture actual network traffic. Long Term Evolution (LTE) OSS MRs do include all traffic, but, until recently, did not contain geographical coordinates to indicate where each MR originated. MRs indicate only the serving radio cell for a UE (plus any detected overlapping cells, if applicable), so the potential UE location may be anywhere within the cell coverage radius. As a result, the accuracy with which the UE location can be determined may range from a few hundred meters to a few kilometers.

Optionally, LTE UEs may additionally report a Timing Advance (TA) parameter, which is used for uplink (UL) synchronization, and also estimates the distance between a UE and its serving cell. While the TA parameter narrows the possible UE-to-cell distance to 78-meter rings (i.e., the granularity of LTE TA reports), the potential UE location may be anywhere within the 78-meter ring. TA-based geolocation uncertainty thus increases with the TA ring radius (i.e., the UE's distance from the cell). This uncertainty can be reduced if overlapping measurements are available from multiple sites via a method known as triangulation.

Geolocation methods at a resolution finer than a TA ring are classified into active mode geolocation and passive mode geolocation. Active mode geolocation functionality is built into a UE device, and is usually embodied as a GPS chip. In contrast, passive mode geolocation uses network-assisted external methods, including, as non-limiting examples, received-signal-strength indication (RSSI), angle of arrival (AOA), time difference of arrival (TDOA), and frequency difference of arrival (FDOA). The accuracy of such external methods depends primarily on three factors: inter-site distance (i.e., short distances between cells results in more accurate geolocation); the underlying radio standard (i.e., 3rd generation Universal Mobile Telecommunications System (UMTS) allows more accurate geolocation than 4th generation Long Term Evolution (LTE) networks); and the number of simultaneously reported sites (i.e., higher accuracy may be achieved with more sites reported).

To overcome relatively inaccurate UE MR geolocation mechanisms, a network feature known as the Minimization of Drive Test (MDT) has been standardized in the 3rd Generation Partnership Project (3GPP) LTE Release 10. This feature takes advantage of globally widespread GPS receiver inclusion into smartphones, which enables GPS coordinates to be appended to MRs provided by a UE. With the MDT feature, every signal level, routinely reported to the OSS as part of network operations, can be paired with the UE's GPS coordinate. This functionality is expected to eliminate drive/walk testing and enable focused radio optimization by identifying exact locations where weak signal levels, high interference, or low user throughputs are experienced. The MDT feature may be selectively enabled by the network operator for each configured frequency separately.

An MDT-enabled UE provides an MDT M1 report as part of its MR. The MDT M1 report includes data regarding Reference Signal Received Power (RSRP) and Reference Signal Received Quality (RSRQ) measurements made by the UE, and can also contain detailed GPS location information if available in the UE. The MDT M1 report from the UE covers both intra-frequency and inter-frequency measurements, and may be used to monitor and detect coverage problems in the network.

However, in practice, MDT is severely limited by six factors:

1. Encrypted iOS traffic: iOS operating system devices (e.g., Apple iPhones and iPad devices) encrypt GPS data, and thus will not include readable coordinates into MDT reports. Due to the widespread use of iOS-based devices, a significant fraction of all UEs are excluded from GPS geolocation.
2. Indoor penetration of GPS signals: GPS is dimensioned for outdoor usage, and consequently, the link budget for GPS-enabled UEs does not accommodate significant building penetration losses. Therefore, in-building UEs are likely to experience outages in GPS reception, and fail to report coordinates as part of MDT M1 reports. Even if MDT M1 reports are transmitted from the UE, accuracy may be compromised by attenuation and scatter through walls and roofs.
3. Privacy: User consent is required before activating the MDT functionality for a given UE because of privacy and legal obligations. Collecting the user consent must be done through a customer care process. The user consent information availability must be considered as a part of the subscription data and must be provisioned to the Home Subscriber Server (HSS) database. Without user consent confirmation provided by the core network, no UE can be selected for MDT measurement, regardless of GPS information.
4. User GPS settings: In order to preserve smartphone batteries, many users disable location services when not explicitly needed for an application. These UEs will not report coordinates as part of MDT M1 reports. Moreover, a cellular mobile radio communication network may have a provision to activate GPS in the background for the purpose of MDT collection, but such activation requires special arrangements to be made with network operators. In many jurisdictions, network operators are unlikely to bypass user consent and activate GPS to avoid legal issues.

5. Network load: If the MDT feature is activated, the amount of Radio Resource Control (RRC) signaling may increase, which affects the capacity of the corresponding eNodeB radio site and the radio air interface. Since using the MDT feature generates RRC signaling between the eNodeB and the UE, the network load is increased both when MDT is activated and terminated, and when the UE sends measurement reports to the eNodeB. This has a potentially negative impact on uplink and downlink user data throughput.
6. Older UE models: Older UE devices that do not have StandaloneGNSS-Location-r10 capability, as defined in 3GPP Technical Specification (TS) 36.331, will not report GPS coordinates as part of their MDT MRs. The fraction of older UEs that lack embedded GPS receivers may be significant in developing countries.

UEs that fall within these six categories may represent a significant fraction of total MR collection that does not report GPS coordinates, despite MDT license and activation. In initial MDT activations in live networks, the fraction of MDT MRs that contained GPS has been observed to range from 0.5% to 5%. That leaves 95% or more of MRs that lack the benefits provided by MDT. Performing geolocation for the UEs providing these MRs must use legacy network-assisted geolocation methods that are much less accurate than the active mode deployed in MDT, and that take longer to converge.

SUMMARY

Systems and methods for geolocating Minimization of Drive Test (MDT) measurement reports (MRs) with missing satellite navigation system coordinates are disclosed herein. Embodiments of a method for geolocating Minimization of Drive Test (MDT) measurement reports (MRs) with missing satellite navigation system coordinates are disclosed herein. In some embodiments, the method comprises, at a computing node, receiving a plurality of complete MRs corresponding to a plurality of user equipments (UEs), wherein each complete MR of the plurality of complete MRs comprises satellite navigation system coordinates identifying a geographic location of a corresponding UE of the plurality of UEs. The method further comprises training a machine learning (ML) model for estimating UE geographic locations based on the plurality of complete MRs, wherein the ML model maps a plurality of radio frequency, RF, signatures of the plurality of complete MRs to corresponding UE geographic locations. As used herein, an "RF signature" of a complete MR comprises one or more radio cell identifiers (IDs) and corresponding Reference Signal Received Power (RSRP) measurements collected at the corresponding UE geographic location.

In some embodiments, the plurality of complete MRs each further comprises a serving cell identifier for a serving cell of the corresponding UE, an RSRP measurement for the serving cell of the corresponding UE, and one or more non-serving cell identifiers and corresponding RSRPs for a corresponding one or more non-serving cells measured simultaneously with the serving cell of the corresponding UE. In such embodiments, the method comprises training the ML model further based on the serving cell identifier, the RSRP measurement, and the one or more non-serving cell identifiers and the corresponding RSRPs of each complete MR of the plurality of complete MRs.

In some embodiments, the plurality of complete MRs each further comprises a timing advance (TA) parameter indicating an estimated distance between the corresponding UE and the serving cell of the corresponding UE. In such embodiments, the method comprises training the ML model further based on the estimated distance between the corresponding UE and the serving cell of the corresponding UE indicated by the TA parameter of each complete MR of the plurality of complete MRs.

In some embodiments, the plurality of complete MRs each further comprises a timestamp and a call identifier. In such embodiments, the method comprises training the ML model further based on excluding geolocations based on the timestamp and the call identifier of each complete MR of the plurality of complete MRs.

In some embodiments, the ML model is based on one or more of a non-linear regression algorithm, a regression tree, and a neural network. In some embodiments, each complete MR of the plurality of complete MRs comprises an MDT M1 report.

In some embodiments, the method further comprises, at a radio access node for a Radio Access Network (RAN) of a cellular communications system, obtaining the ML model from the computing node, and receiving an incomplete MR corresponding to a UE. The method also comprises determining that the incomplete MR lacks satellite navigation system coordinates identifying a geographic location of the UE. The method additionally comprises, responsive to determining that the incomplete MR lacks the satellite navigation system coordinates, predicting the geographic location of the UE based on measurements comprised in the incomplete MR and the ML model.

Embodiments of a computing node for geolocating MDT MRs with missing satellite navigation system coordinates are also disclosed herein. In some embodiments, the computing node comprises a network interface and processing circuitry. The processing circuitry is adapted to cause the computing node to receive a plurality of complete MRs corresponding to a plurality of UEs wherein each complete MR of the plurality of complete MRs comprises satellite navigation system coordinates identifying a geographic location of a corresponding UE of the plurality of UEs. The processing circuitry is further adapted to cause the computing node to train an ML model for estimating UE geographic locations based on the plurality of complete MRs, wherein the ML model maps a plurality of RF signatures of the plurality of complete MRs to corresponding UE geographic locations. In some embodiments, the processing circuitry is adapted to cause the computing node to perform any of the steps attributed to the computing node in the above-disclosed methods.

Embodiments of a method performed by a radio access node for a RAN of a cellular communications system to geolocate MDT MRs with missing satellite navigation system coordinates are also disclosed herein. In some embodiments, the method comprises obtaining an ML model for estimating UE geographic locations based on measurements comprised in an MR. The method further comprises receiving an incomplete MR corresponding to a UE, and determining that the incomplete MR lacks satellite navigation system coordinates identifying a geographic location of the UE. The method also comprises, responsive to determining that the incomplete MR lacks the satellite navigation system coordinates, predicting the geographic location of the UE based on measurements comprised in the incomplete MR and the ML model.

In some embodiments, obtaining the ML model for estimating UE geographic locations comprises receiving the ML model from a computing node. In some embodiments, obtaining the ML model for estimating UE geographic locations comprises receiving a plurality of complete MRs corresponding to a plurality of UEs, wherein each complete MR of the plurality of complete MRs comprises satellite navigation system coordinates identifying a geographic location of a corresponding UE of the plurality of UEs. The method further comprises training the ML model for estimating UE geographic locations based on the plurality of complete MRs, wherein the ML model maps a plurality of RF signatures of the plurality of complete MRs to corresponding UE geographic locations.

In some embodiments, the plurality of complete MRs each further comprises a serving cell identifier for a serving cell of the corresponding UE, an RSRP measurement for the serving cell of the corresponding UE, and one or more non-serving cell identifiers and corresponding RSRPs for a corresponding one or more non-serving cells measured simultaneously with the serving cell of the corresponding UE. In such embodiments, training the ML model is further based on the serving cell identifier, the RSRP measurement, and the one or more non-serving cell identifiers and the corresponding RSRPs of each complete MR of the plurality of complete MRs.

In some embodiments, the plurality of complete MRs each further comprises a TA parameter indicating an estimated distance between the corresponding UE and the serving cell of the corresponding UE. In such embodiments, training the ML model is further based on the estimated distance between the corresponding UE and the serving cell of the corresponding UE indicated by the TA parameter of each complete MR of the plurality of complete MRs.

In some embodiments, the plurality of complete MRs each further comprises a timestamp and a call identifier. In such embodiments, training the ML model is further based on excluding geolocations based on the timestamp and the call identifier of each complete MR of the plurality of complete MRs.

In some embodiments, the ML model is based on one or more of a non-linear regression algorithm, a regression tree, and a neural network. In some embodiments, each complete MR of the plurality of complete MRs comprises an MDT M1 report.

Embodiments of a radio access node for a RAN of a cellular communications system to geolocate MDT MRs with missing satellite navigation system coordinates are also disclosed herein. In some embodiments, the radio access node is adapted to obtain an ML model for estimating UE geographic locations based on measurements comprised in an MR. The radio access node is further adapted to receive an incomplete MR corresponding to a UE, and determine that the incomplete MR lacks satellite navigation system coordinates identifying a geographic location of the UE. The radio access node is also adapted, responsive to determining that the incomplete MR lacks the satellite navigation system coordinates, predict the geographic location of the UE based on measurements comprised in the incomplete MR and the ML model. In some embodiments, the radio access node is further adapted to perform any of the steps attributed to the radio access node in the above-disclosed methods.

Embodiments of a radio access node for a RAN of a cellular communications system enabled to geolocate MDT MRs with missing satellite navigation system coordinates are also disclosed herein. In some embodiments, the radio access node comprises a network interface and processing circuitry associated with the network interface. The processing circuitry is adapted to cause the radio access node to obtain an ML model for estimating UE geographic locations based on measurements comprised in an MR. The processing circuitry is further adapted to cause the radio access node to receive an incomplete MR corresponding to a UE, and determine that the incomplete MR lacks satellite navigation system coordinates identifying a geographic location of the UE. The processing circuitry is also adapted to cause the radio access node to, responsive to determining that the incomplete MR lacks the satellite navigation system coordinates, predict the geographic location of the UE based on measurements comprised in the incomplete MR and the ML model. In some embodiments, the processing circuitry is further adapted to cause the radio access node to perform any of the steps attributed to the radio access node in the above-disclosed methods.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
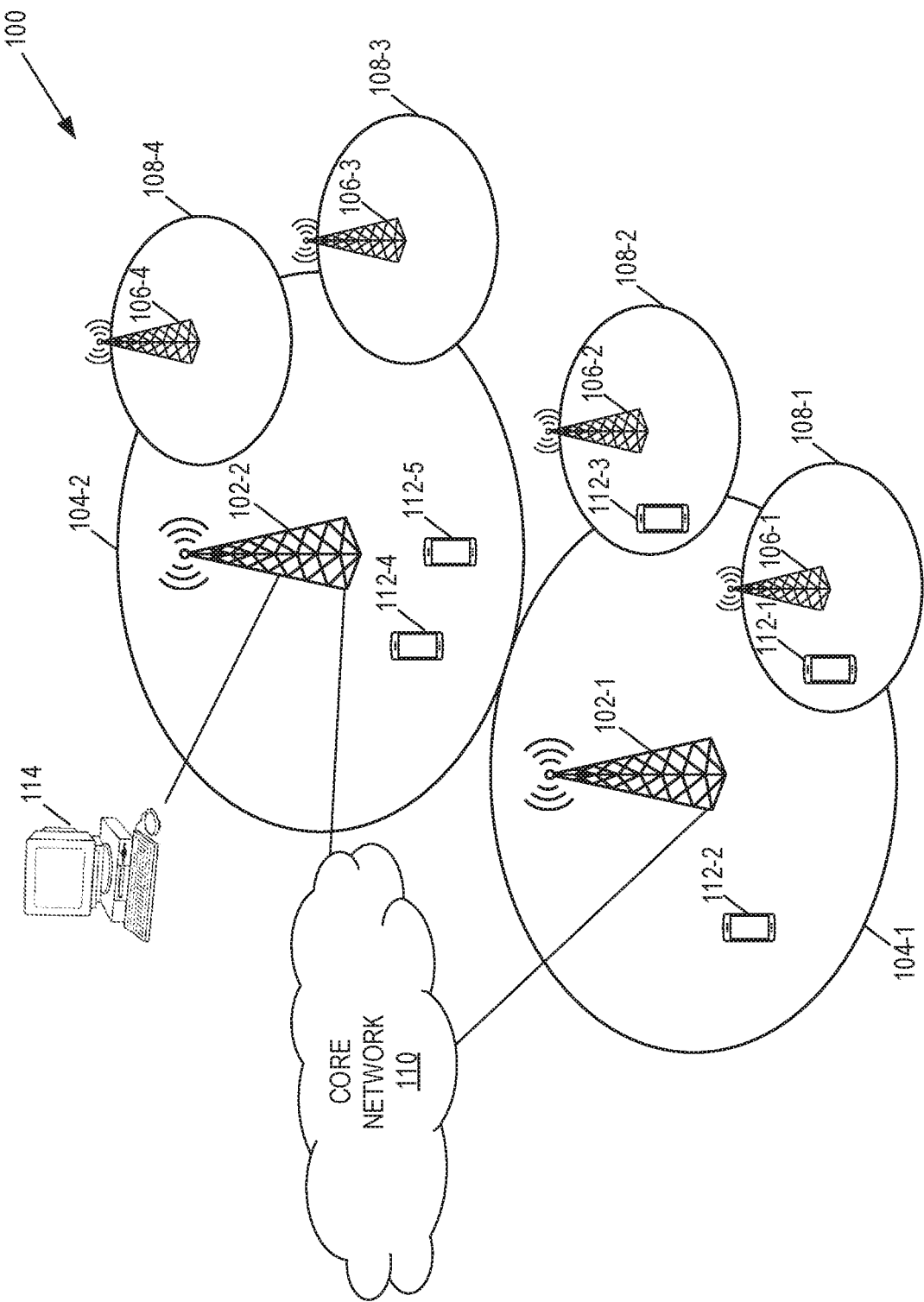
FIG. 1 illustrates one example of a cellular communications system according to some embodiments of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications system that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pica base station, a home eNB, or the like), and a relay node.

Core Network Entity: As used herein, a "core network entity" is any type of entity in a core network. Some examples of a core network entity include, e.g., a Mobility Management Entity (MME), a Packet Data Network Gateway (P-GW), a Service Capability Exposure Function (SCEF), or the like in an Evolved Packet Core (EPC). Some other examples of a core network entity include, e.g., an Access and Mobility Management Function (AMF), a Network Slice Selection Function (NSSF), an Authentication Server Function (AUSF), a Unified Data Management function (UDM), a Session Management Function (SMF), a Policy Control Function (PCF), an Application Function (AF), a Network Exposure Function (NEF), a User Plane Function (UPF), or the like in a 5G Core (5GC). A core network entity may be implemented as a physical network node (e.g., including hardware or a combination of hardware and software) or implemented as a functional entity (e.g., as software) that is, e.g., implemented on a physical network node or distributed across two or more physical network nodes.

Wireless Device: As used herein, a "wireless device" is any type of device that has access to (i.e., is served by) a cellular communications system by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Systems and methods for geolocating Minimization of Drive Test (MDT) measurement reports (MRs) with missing satellite navigation system coordinates are disclosed herein. As noted above, there currently exist certain challenges with existing solutions. In particular, while the MDT feature enables satellite navigation system coordinates (e.g., Global Positioning System (GPS) coordinates, as a non-limiting example) to be included within an MR provided by a user equipment (UE), a significant fraction of UEs may still be unable to report satellite navigation system coordinates using MDT. Consequently, performing geolocation for these UEs must rely on legacy network-assisted geolocation methods that are much less accurate than the active mode deployed in MDT, and that take longer to converge.

Accordingly, certain aspects of the present disclosure and their embodiments may provide solutions to the aforementioned or other challenges. In this regard, in the present disclosure, embodiments of apparatuses and methods of operations thereof are proposed for geolocating MDT MRs with missing satellite navigation system coordinates (referred to herein as "incomplete" MRs). In some embodiments, a computing node (e.g., a standalone computing node or a radio access node of a radio access network (RAN), as non-limiting examples) receives a plurality of "complete" MRs (i.e., MRs that each comprise satellite navigation system coordinates that identify a geographic location of a corresponding UE). The computing node uses the plurality of complete MRs to train a machine learning (ML) model for estimating UE geographic locations. The ML model may be based on one or more of a non-linear regression algorithm, a regression tree, and a neural network, as non-limiting examples, and may be trained using conventional ML techniques. The ML model maps a plurality of radio frequency (RF) signatures of the plurality of complete MRs to corresponding UE geographic locations.

A radio access node subsequently obtains the ML model (e.g., either from the computing node that trained the ML model, or by generating and training the ML model itself). Upon receiving an incomplete MR that lacks satellite navigation system coordinates for a corresponding UE, the radio access node uses the ML model to predict a geographic location of the UE based on measurements in the incomplete MR and the ML model. In this manner, ML models trained with complete MRs that provide satellite navigation system coordinates may be used to estimate UE locations and fill geolocation gaps in incomplete MRs, such as MRs collected from UEs for which the MDT feature is unavailable or deactivated.

Before describing operations for geolocating MDT MRs with missing satellite navigation system coordinates in greater detail, embodiments of cellular communications systems in which embodiments of the present disclosure may be implemented are first discussed. In this regard, FIG. 1 illustrates a cellular communications system 100 that is a 5G System (5GS) including a 5G RAN (e.g., an NR RAN) and a 5G Core (5GC). It is to be understood, however, that the present disclosure is not limited to 5GS/5GC networks. In the example of FIG. 1, the cellular communications system 100 includes base stations 102-1 and 102-2, which in 5G NR are referred to as gNBs, controlling corresponding macro cells 104-1 and 104-2. The base stations 102-1 and 102-2 are generally referred to herein collectively as base stations 102 and individually as base station 102. Likewise, the macro cells 104-1 and 104-2 are generally referred to herein collectively as macro cells 104 and individually as macro cell 104. The cellular communications system 100 may also include a number of low-power nodes 106-1 through 106-4 controlling corresponding small cells 108-1 through 108-4. The low-power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low-power nodes 106-1 through 106-4 are generally referred to herein collectively as low-power nodes 106 and individually as low-power node 106. Likewise, the small cells 108-1 through 108-4 are generally referred to herein collectively as small cells 108 and individually as small cell 108. The base stations 102 (and optionally the low-power nodes 106) are connected to a core network 110. For a 5GS, the core network 110 is a 5GC.

The base stations 102 and the low-power nodes 106 provide service to wireless devices 112-1 through 112-5 in the corresponding cells 104 and 108. The wireless devices 112-1 through 112-5 are generally referred to herein collectively as wireless devices 112 and individually as wireless device 112. The wireless devices 112 are also sometimes referred to herein as UEs. In the example of FIG. 1, a computing node 114 is also provided. The computing node 114 may be communicatively coupled to one or more base stations 102 (such as, e.g., the base station 102-2, as shown in FIG. 1), and may be configured to perform processing tasks on behalf of and/or exchange data with the base stations 102. In some embodiments, the computing node 114 may provide processing functionality for an Operations Support Subsystem (OSS) software platform of the cellular communications system 100.

Figure 2:
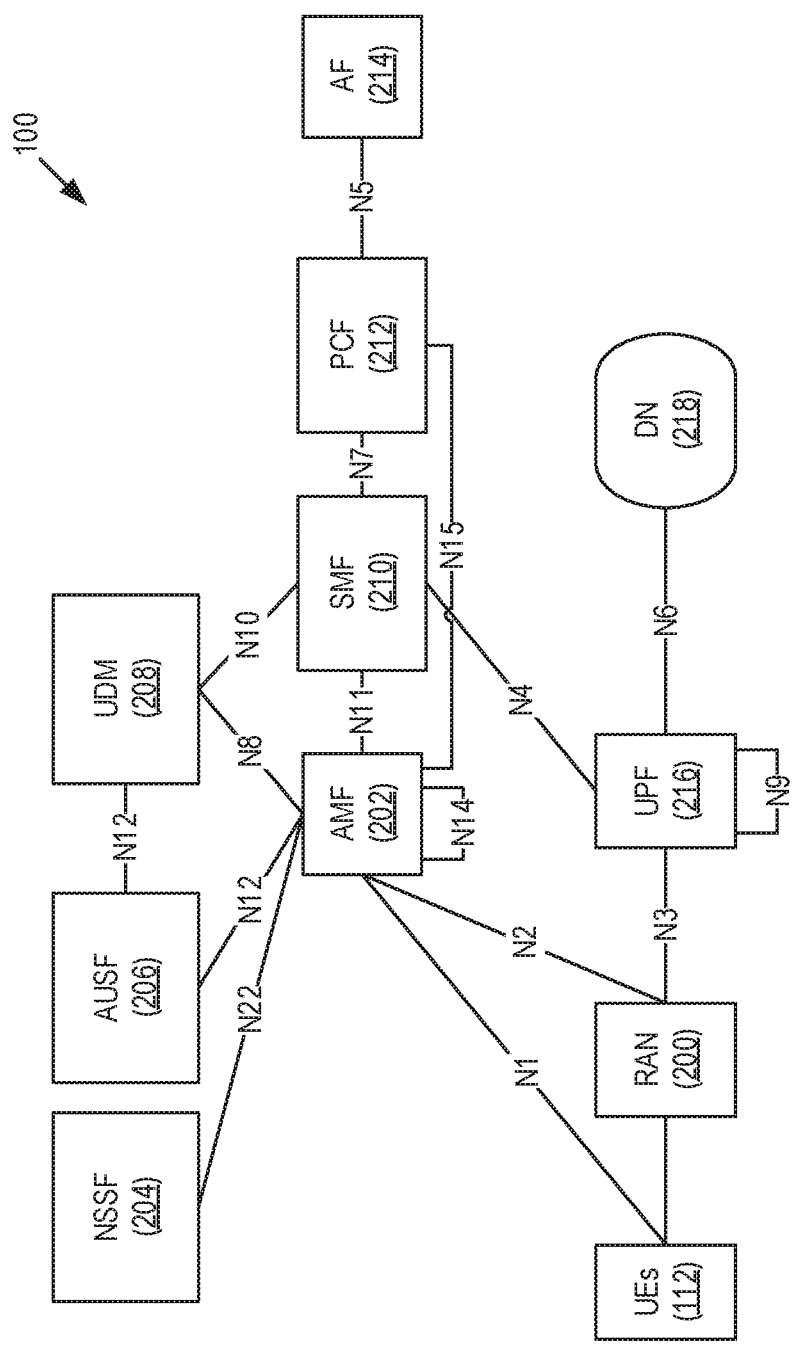
FIG. 2 illustrates a wireless communications system represented as a 5G network architecture composed of core Network Functions (NFs), where interaction between any two NFs is represented by a point-to-point reference point/interface.

FIG. 2 illustrates one particular implementation of the cellular communications system 100 of FIG. 1, in which the cellular communications system 100 is represented as a 5G network architecture composed of core Network Functions (NFs), where interaction between any two NFs is represented by a point-to-point reference point/interface. Seen from the access side, the 5G network architecture shown in FIG. 2 comprises a plurality of UEs 112 connected to either a RAN 200 or an Access Network (AN) (not shown) as well as an AMF 202. Typically, the RAN 200 comprises base stations, e.g., such as eNBs or gNBs or similar. Seen from the core network side, the 5G core NFs shown in FIG. 2 include an NSSF 204, an AUSF 206, a UDM 208, the AMF 202, an SMF 210, a PCF 212, and an AF 214.

Reference point representations of the 5G network architecture are used to develop detailed call flows in the normative standardization. The N1 reference point is defined to carry signaling between the UEs 112 and AMF 202. The reference points for connecting between the RAN 200 and the AMF 202 and between the RAN 200 and a UPF 216 are defined as N2 and N3, respectively. There is a reference point, N11, between the AMF 202 and the SMF 210, which implies that the SMF 210 is at least partly controlled by the AMF 202. Reference point N4 is used by the SMF 210 and the UPF 216 so that the UPF 216 can be set using the control signal generated by the SMF 210, and the UPF 216 can report its state to the SMF 210. N9 is the reference point for the connection between different UPFs 216, and N14 is the reference point connecting between different AMFs 202. Reference points N15 and N7 are defined since the PCF 212 applies policy to the AMF 202 and the SMF 210, respectively. Reference point N12 is required for the AMF 202 to perform authentication of the UEs 112. Reference points N8 and N10 are defined because the subscription data of the UEs 112 is required for the AMF 202 and the SMF 210.

The 5G core network aims to separate the user plane and the control plane. The user plane carries user traffic while the control plane carries signaling in the network. In FIG. 2, the UPF 216 is in the user plane and all other NFs, i.e., the AMF 202, the SMF 210, the PCF 212, the AF 214, the AUSF 206, and the UDM 208, are in the control plane. Separating the user plane and the control plane guarantees each plane's resources to be scaled independently. It also allows the UPF 216 to be deployed separately from control plane functions in a distributed fashion. In this architecture, the UPF 216 may be deployed very close to the UEs 112 to shorten the Round Trip Time (RTT) between the UEs 112 and the data network for some applications requiring low latency.

The core 5G network architecture is composed of modularized functions. For example, the AMF 202 and the SMF 210 are independent functions in the control plane. Separated AMFs 202 and SMFs 210 allow independent evolution and scaling. Other control plane functions like the PCF 212 and the AUSF 206 can be separated as shown in FIG. 2. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs 216.

Figure 3:
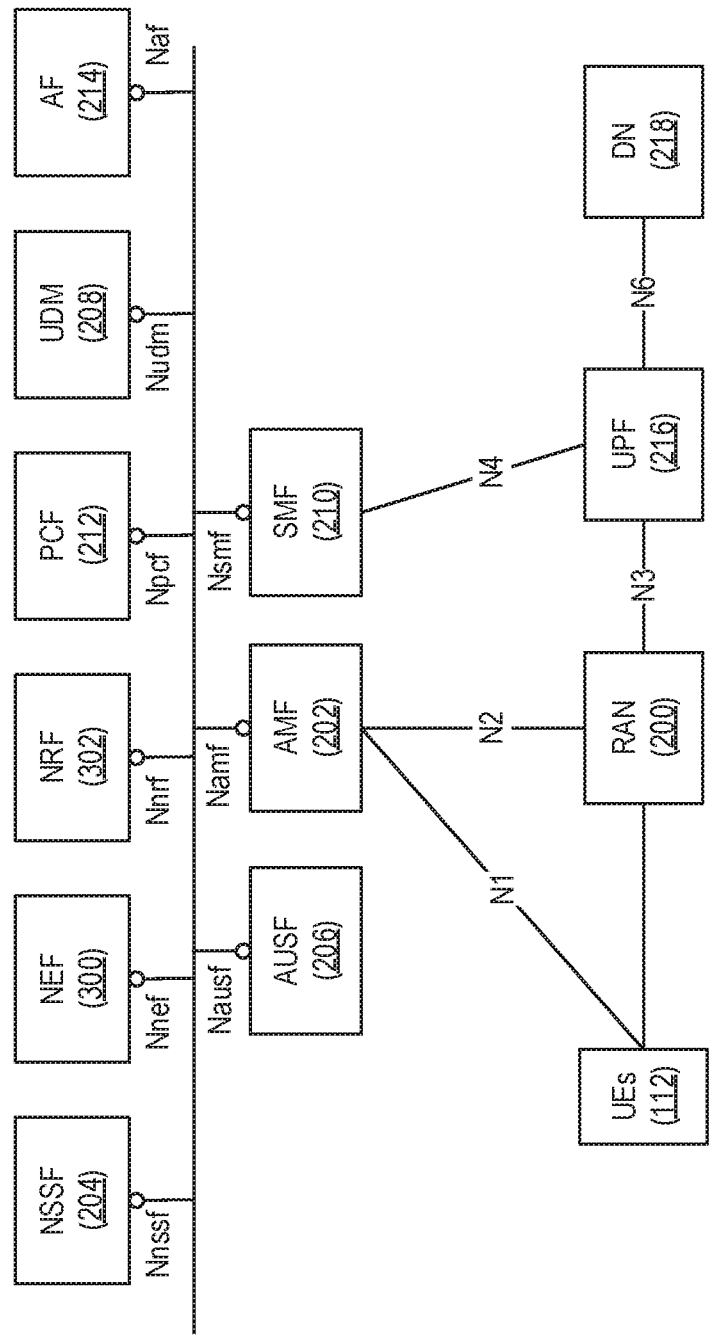
FIG. 3 illustrates a 5G network architecture using service-based interfaces between the NFs in the control plane, instead of the point-to-point reference points/interfaces used in the 5G network architecture of FIG. 2.

FIG. 3 illustrates a 5G network architecture using service-based interfaces between the NFs in the control plane, instead of the point-to-point reference points/interfaces used in the 5G network architecture of FIG. 2. However, the NFs described above with reference to FIG. 2 correspond to the NFs shown in FIG. 3. The service(s), etc. that an NF provides to other authorized NFs can be exposed to the authorized NFs through the service-based interface. In FIG. 3, the service-based interfaces are indicated by the letter "N" followed by the name of the NF, e.g. Namf for the service-based interface of the AMF 202, and Nsmf for the service-based interface of the SMF 210, etc. An NEF 300 and a Network Repository Function (NRF) 302 in FIG. 3 are not shown in FIG. 2 discussed above. However, it should be clarified that all NFs depicted in FIG. 2 can interact with the NEF 300 and the NRF 302 of FIG. 3 as necessary, though not explicitly indicated in FIG. 2.

Some properties of the NFs shown in FIGS. 2 and 3 may be described in the following manner. The AMF 202 provides UE-based authentication, authorization, mobility management, etc. A UE of the UEs 112, even using multiple access technologies, is basically connected to a single AMF 202 because the AMF 202 is independent of the access technologies. The SMF 210 is responsible for session management and allocates Internet Protocol (IP) addresses to the UEs 112. It also selects and controls the UPF 216 for data transfer(s). If a UE 112 has multiple sessions, different SMFs 210 may be allocated to each session to manage them individually and possibly provide different functionalities per session. The AF 214 provides information on the packet flow to the PCF 212 responsible for policy control in order to support Quality of Service (QoS). Based on the information, the PCF 212 determines policies about mobility and session management to make the AMF 202 and the SMF 210 operate properly. The AUSF 206 supports authentication functions for UEs 112 or similar and thus stores data for authentication of UEs 112 or similar while the UDM 208 stores subscription data of the UEs 112. The Data Network (DN) 218, not part of the 5G core network, provides Internet access or operator services and similar functionality.

An NF may be implemented either as a network element on a dedicated hardware, as a software instance running on a dedicated hardware, or as a virtualized function instantiated on an appropriate platform, e.g., a cloud infrastructure.

Embodiments disclosed herein employ complete MRs that include satellite navigation coordinates (e.g., MDT M1 reports provided by the UEs 112 of FIG. 1 that are located in MDT-enabled networks) to train ML models that in turn are used to provide geolocation for UEs 112 that provide incomplete MRs lacking geographical coordinates. Generally speaking, such ML models may be based on one or more of a non-linear regression algorithm, a regression tree, and a neural network, with non-linear supervised regression trees and neural networks being preferred. However, it is to be understood that the methods described herein are algorithm agnostic. In some embodiments, multiple algorithms may be provided, with a most appropriate algorithm being selected at the runtime.

Figure 4:
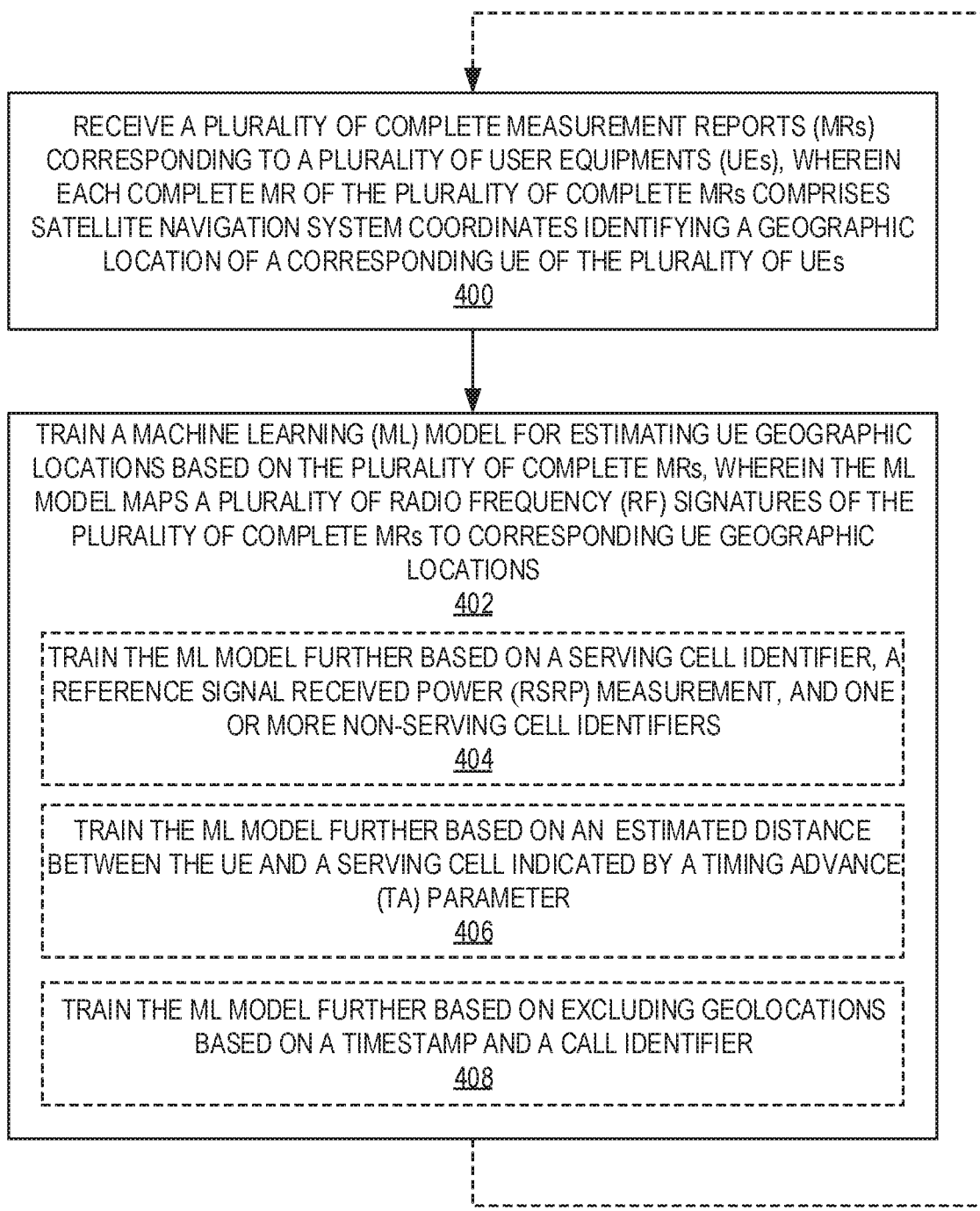
FIG. 4 is a flowchart illustrating exemplary operations that may be performed by a computing node and/or a radio access node of a radio access network (RAN) for training a machine learning (ML) model for estimating user equipment (UE) geographic locations using complete MRs that provide satellite navigation system coordinates.

Operations for geolocating MDT MRs with missing satellite navigation coordinates may be divided into two separate but interrelated tasks: training the ML model based on complete MRs that include satellite navigation coordinates and related data, and using the ML model to predict locations for UEs 112 associated with incomplete MRs that lack satellite navigation coordinates. In this regard, FIG. 4 is a flowchart illustrating exemplary operations that may be performed by the computing node 114 and/or by a radio access node (such as a base station 102) of the RAN 200 for training an ML model for estimating UE geographic locations. In describing FIG. 4, elements of FIG. 1 are referenced for the sake of clarity.

In FIG. 4, operations begin with a computing node, such as the computing node 114 or the radio access node 102, receiving a plurality of complete MRs corresponding to a plurality of UEs 112 (block 400). In some embodiments, the MR may be extracted from the OSS of the cellular communications system 100 using an appropriate mediation layer for parsing cell traces from a cellular infrastructure vendor. Each complete MR of the plurality of complete MRs includes satellite navigation coordinates identifying a geographic location of a corresponding UE 112 of the plurality of UEs 112. The satellite navigation system coordinates comprise latitude and longitude coordinates, and may be provided by, as non-limiting examples, the Global Positioning System (GPS), the Global Navigation Satellite System (GLONASS), BeiDou Navigation Satellite System (BDS), the Galileo satellite navigation system, the Quasi-Zenith Satellite System (QZSS), and/or the Indian Regional Navigation Satellite System (IRNSS). According to some embodiments, the MR comprising the satellite navigation system coordinates may be an MDT M1 report.

The computing node then trains an ML model for estimating UE geographic locations based on the plurality of complete MRs, wherein the ML model maps a plurality of RF signatures of the plurality of complete MRs to corresponding UE geographic locations (block 402). In some embodiments, training the ML model is based on a serving cell identifier, a Reference Signal Received Power (RSRP) measurement, and one or more non-serving cell identifiers and corresponding RSRPs included within each complete MR of the plurality of complete MRs (block 404). The serving cell identifier and the one or more non-serving cell identifiers may comprise Physical Cell Identifiers (PCIS) corresponding to a serving cell (such as one of cells 104 or 108) and one or more non-serving cells 104, 108 that are measured simultaneously with the serving cell 104, 108. In such embodiments, each complete MR includes an RSRP measurement for each of the serving cell 104, 108 and the one or more non-serving cells 104, 108.

Other embodiments may provide that training the ML model is further based on an estimated distance between the UE 112 and the serving cell 104, 108 indicated by a timing advance (TA) parameter included within each complete MR of the plurality of complete MRs (block 406). The TA parameter may be an optional but recommended parameter in each complete MR, and may be incorporated into the ML model to increase geolocation accuracy by limiting location estimation errors to a TA ring corresponding to the reported TA parameter. In still other embodiments, training the ML model may be based on excluding geolocations based on a timestamp and a call identifier included within each complete MR of the plurality of complete MRs (block 408). For example, excessively distant geolocations that are detected within a short time separation (as indicated by the timestamp) within the same call (as indicated by the call identifier) may be avoided.

It is to be understood that training the ML model may be carried out using conventional ML techniques. Once trained, the ML model may be used for geolocating UE MRs even after the MDT feature is deactivated for the cellular communications system 100. The ML model will remain valid as long as the RF environment provided by the cellular communications system 100 remains stable. The ML model will have to be refreshed after network modifications (e.g., power changes, antenna changes, site additions, and/or site decommissions). As seen in FIG. 4, the operations illustrated therein may be repeated multiple times as additional complete MRs comprising satellite navigation system coordinates are received by the node.

Figure 5:
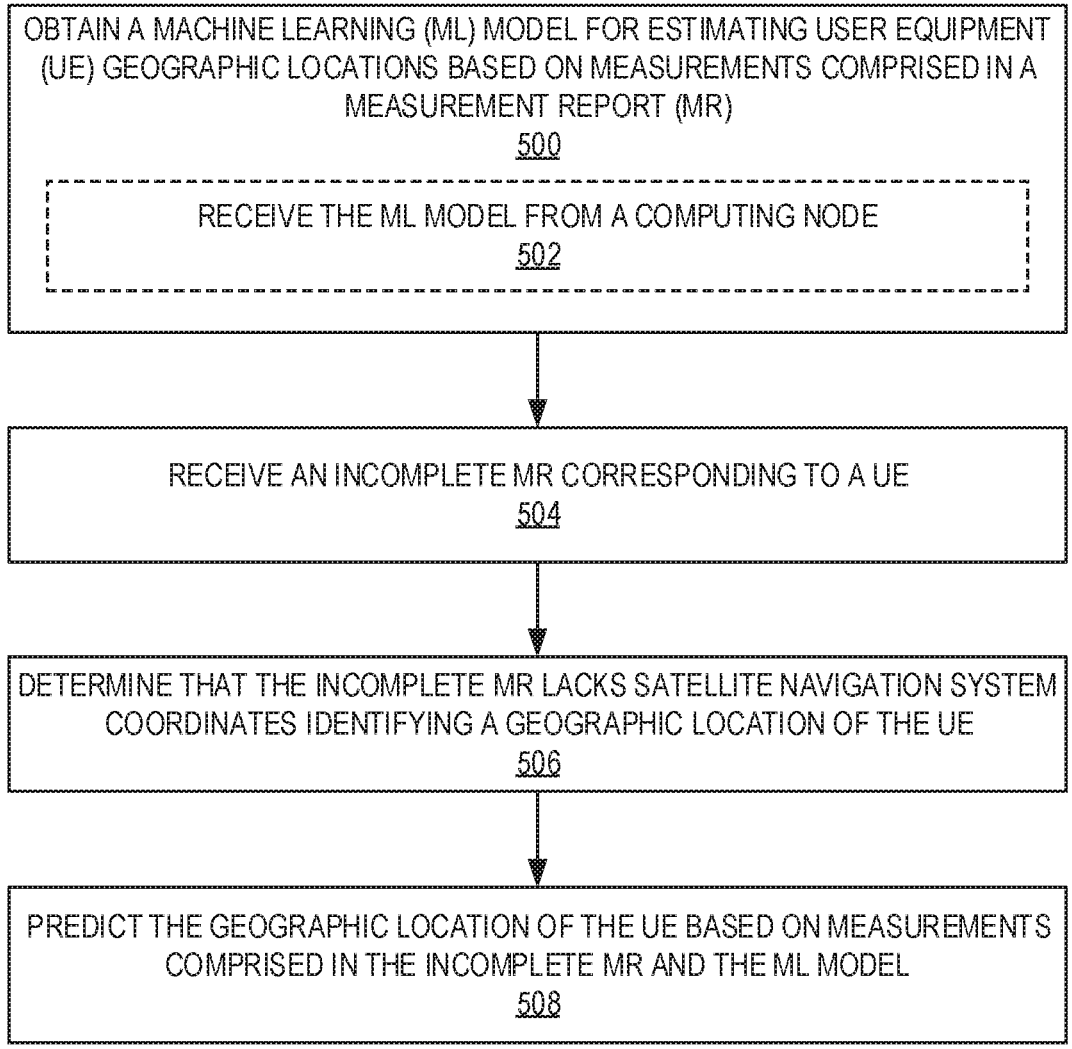
FIG. 5 is a flowchart illustrating exemplary operations that may be performed by a radio access node of a RAN for employing an ML model to predict a geographic location of a UE based on an incomplete MR lacking satellite navigation system coordinates.

FIG. 5 is a flowchart illustrating exemplary operations that may be performed by the radio access node 102 of the RAN 200 for employing an ML model to predict a geographic location of a UE 112 for which satellite navigation system coordinates are not provided in an MR. The radio access node 102 first obtains the ML model for estimating UE geographic locations based on measurements comprised in an MR (block 500). As discussed above, in some embodiments, the operations of block 500 for obtaining the ML model may comprise receiving the ML model from the computing node 114 (block 502). Some embodiments may provide that the operations of block 500 for obtaining the ML model may comprise the radio access node 102 itself performing the operations illustrated in FIG. 4 for training the ML model.

The radio access node 102 then receives an incomplete MR corresponding to a UE 112 (block 504). The radio access node 102 determines that the incomplete MR lacks satellite navigation system coordinates identifying a geographic location of the UE 112 (block 506). In response, the radio access node 102 predicts, using the ML model, the geographic location of the UE 112 based on measurements comprised in the incomplete MR and the ML model (block 508).

Figure 6:
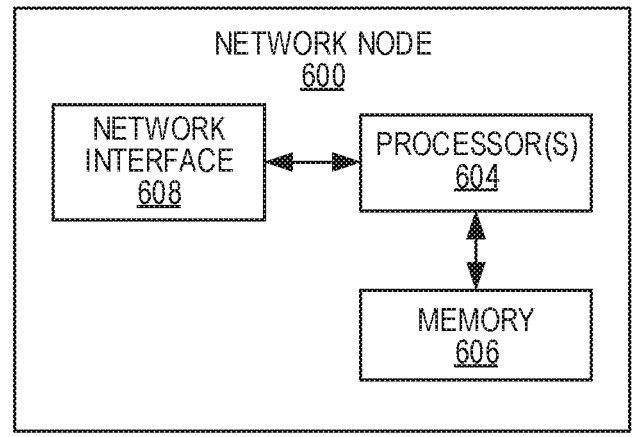
FIG. 6 is a schematic block diagram of a network node according to some embodiments of the present disclosure.

FIG. 6 is a schematic block diagram of a network node 600 according to some embodiments of the present disclosure. The network node 600 may be, for example, a core network node or a network node implementing a core network entity (e.g., an SMF, UPF, NEF, or the like). As illustrated, the network node 600 includes one or more processors 604 (e.g., Central Processing Units (CPUs), Application Specific Integrated Circuits (ASICs), Field Programmable Gate Arrays (FPGAs), and/or the like), a memory 606, and a network interface 608. The one or more processors 604 are also referred to herein as processing circuitry. The one or more processors 604 operate to cause the network node 600 to provide one or more functions of a core network entity (e.g., an AMF, V-SMF, V-UPF, H-SMF, H-UPF, UDM, or NEF) as described herein. In some embodiments, the function(s) is implemented in software that s stored, e.g., in the memory 606 and executed by the one or more processors 604.

Figure 7:
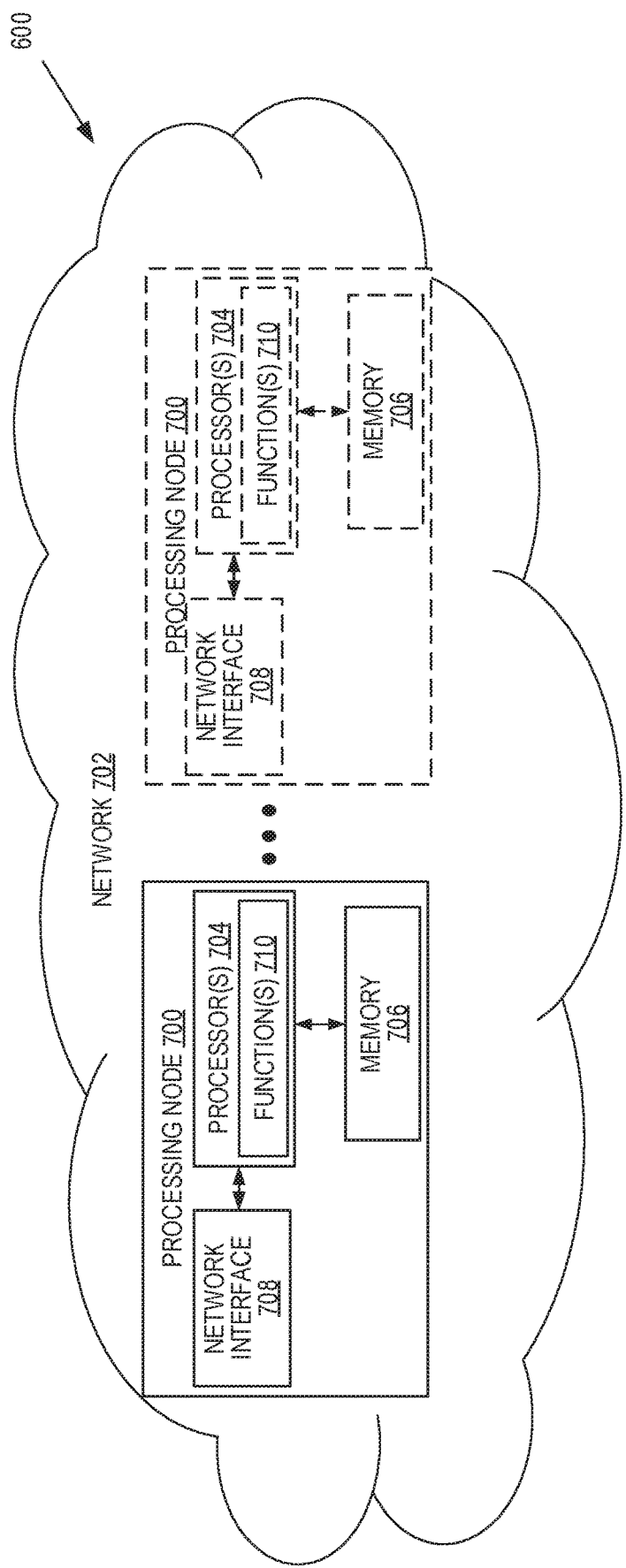
FIG. 7 is a schematic block diagram that illustrates a virtualized embodiment of the network node of FIG. 6 according to some embodiments of the present disclosure.

FIG. 7 is a schematic block diagram that illustrates a virtualized embodiment of the network node 600 according to some embodiments of the present disclosure. This discussion is equally applicable to other types of network nodes. Further, other types of network nodes may have similar virtualized architectures.

As used herein, a "virtualized" network node is an implementation of the network node 600 in which at least a portion of the functionality of the network node 600 is implemented as a virtual component(s) (e.g., via a virtual machine(s) executing on a physical processing node(s) in a network(s)). As illustrated, in this example, the network node 600 includes one or more processing nodes 700 coupled to or included as part of a network(s) 702. Each processing node 700 includes one or more processors 704 (e.g., CPUs, ASICs, FPGAs, and/or the like), a memory 706, and a network interface 708.

In this example, one or more functions 710 of the network node 600 described herein (e.g., the function(s) of a core network entity such as, e.g., an AMF, V-SMF, V-UPF, H-SMF, H-UPF, UDM, or NEF) are implemented at the one or more processing nodes 700 in any desired manner. In some particular embodiments, some or all of the one or more functions 710 of the network node 600 described herein are implemented as virtual components executed by one or more virtual machines implemented in a virtual environment(s) hosted by the processing node(s) 700.

In some embodiments, a computer program including instructions which, when executed by at least one processor, cause the at least one processor to carry out the functionality of a core network entity (e.g., an AMF, V-SMF, V-UPF, H-SMF, H-UPF, UDM, or NEF) as described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 8:
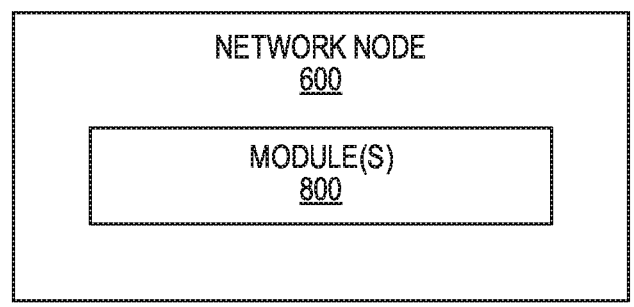
FIG. 8 is a schematic block diagram of the network node of FIG. 6 according to some other embodiments of the present disclosure.

FIG. 8 is a schematic block diagram of the network node 600 according to some other embodiments of the present disclosure. The network node 600 includes one or more modules 800, each of which is implemented in software. The module(s) 800 provides the functionality of a core network entity (e.g., an AMF, V-SMF, V-UPF, H-SMF, H-UPF, UDM, or NEF) as described herein.

Figure 9:
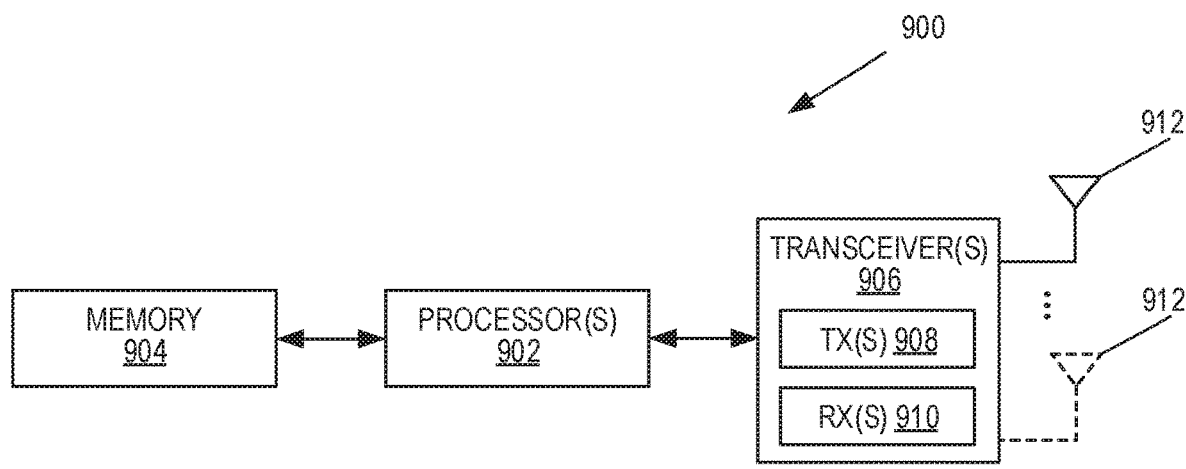
FIG. 9 is a schematic block diagram of a UE according to some embodiments of the present disclosure.

FIG. 9 is a schematic block diagram of a UE 900 according to some embodiments of the present disclosure. As illustrated, the UE 900 includes one or more processors 902 (e.g., CPUs, ASICs, FPGAs, and/or the like), a memory 904, and one or more transceivers 906 each including one or more transmitters 908 and one or more receivers 910 coupled to one or more antennas 912. The transceiver(s) 906 includes radio-front end circuitry connected to the antenna(s) 912 that is configured to condition signals communicated between the antenna(s) 912 and the processor(s) 902, as will be appreciated by one of ordinary skill in the art. The processor(s) 902 is also referred to herein as processing circuitry. The transceiver(s) 906 is also referred to herein as radio circuitry. In some embodiments, the functionality of the UE 900 described above may be fully or partially implemented in software that is, e.g., stored in the memory 904 and executed by the processor(s) 902. Note that the UE 900 may include additional components not illustrated in FIG. 9 such as, e.g., one or more user interface components (e.g., an input/output interface including a display, buttons, a touch screen, a microphone, a speaker(s), and/or the like and/or any other components for allowing input of information into the UE 900 and/or allowing output of information from the UE 900), a power supply (e.g., a battery and associated power circuitry), etc.

In some embodiments, a computer program including instructions which, when executed by at least one processor, cause the at least one processor to carry out the functionality of the UE 900 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
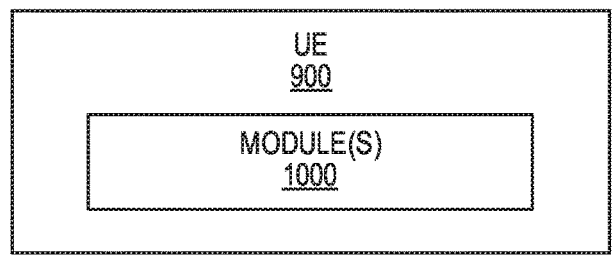
FIG. 10 is a schematic block diagram of the UE of FIG. 9 according to some other embodiments of the present disclosure.

FIG. 10 is a schematic block diagram of the UE 900 according to some other embodiments of the present disclosure. The UE 900 includes one or more modules 1000, each of which is implemented in software. The module(s) 1000 provides the functionality of the UE 900 described herein.

Figure 11:
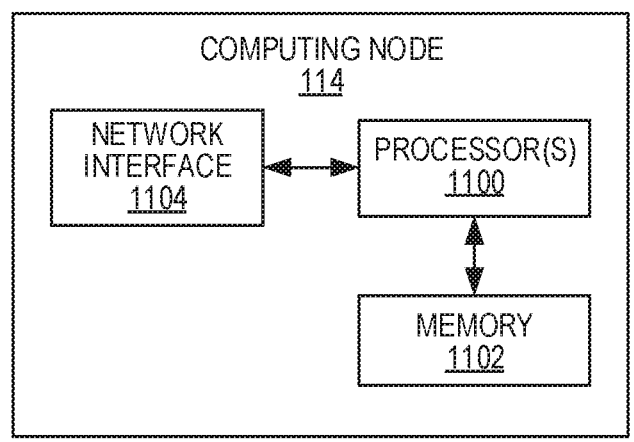
FIG. 11 is a schematic block diagram of a computing node according to some embodiments of the present disclosure.

FIG. 11 is a schematic block diagram of the computing node 114 of FIG. 1 according to some embodiments of the present disclosure. As illustrated, the computing node 114 includes one or more processors 1100 (e.g., CPUs, ASICs, FPGAs, and/or the like), a memory 1102, and a network interface 1104. The one or more processors 1100 are also referred to herein as processing circuitry. The one or more processors 1100 operate to cause the computing node 114 to provide one or more functions for training an ML model as described herein. In some embodiments, the one or more functions are implemented in software that is stored, e.g., in the memory 1102 and executed by the one or more processors 1100.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

While not being limited thereto, some example embodiments of the present disclosure are provided below.

Embodiment 1: A method for geolocating MDT MRs with missing satellite navigation system coordinates, the method comprising, at a computing node (114):
- receiving (400) a plurality of complete MRs corresponding to a plurality of UEs (112) wherein each complete MR of the plurality of complete MRs comprises satellite navigation system coordinates identifying a geographic location of a corresponding UE (112) of the plurality of UEs (112); and
- training (412) an ML model for estimating UE geographic locations based on the plurality of complete MRs, where the ML model maps a plurality of RF signatures of the plurality of complete MRs to corresponding UE geographic locations.

Embodiment 2: The method of embodiment 1, wherein each RF signature of the plurality of RF signatures comprises one or more measurements comprised in a complete MR of the plurality of complete MRs.

Embodiment 3: The method of embodiment 1, wherein:
the plurality of complete MRs each further comprises:
- a serving cell identifier for a serving cell (104, 108) of the corresponding UE (112);
- a an RSRP measurement for the serving cell (104, 108) of the corresponding UE (112); and
- one or more non-serving cell identifiers and corresponding RSRPs for a corresponding one or more non-serving cells (104, 108) measured simultaneously with the serving cell (104, 108) of the corresponding UE (112); and
training (412) the ML model is further based on the serving cell identifier, the RSRP measurement, and the one or more non-serving cell identifiers and the corresponding RSRPs of each complete MR of the plurality of complete MRs.

Embodiment 4: The method of embodiment 1, wherein:
the plurality of complete MRs each further comprises a TA parameter indicating an estimated distance between the corresponding UE (112) and the serving cell (104, 108) of the corresponding UE (112); and
training (412) the ML model is further based on the estimated distance between the corresponding UE and the serving cell (104, 108) of the corresponding UE (112) indicated by the TA parameter of each complete MR of the plurality of complete MRs.

Embodiment 5: The method of embodiment 1, wherein:
the plurality of complete MRs each further comprises a timestamp and a call identifier; and
training (412) the ML model is further based on excluding geolocations based on the timestamp and the call identifier of each complete MR of the plurality of complete MRs.

Embodiment 6: The method of embodiment 1, wherein the ML model is based on one or more of a non-linear regression algorithm, a regression tree, and a neural network.

Embodiment 7: The method of embodiment 1, wherein each complete MR of the plurality of complete MRs comprises an MDT M1 report.

Embodiment 8: The method of embodiment 1, further comprising, at a radio access node (102) for a RAN (200) of a cellular communications system (100):
- obtaining (500) the ML model from the computing node (114);
- receiving (504) an incomplete MR corresponding to a UE (112);
- determining (506) that the incomplete MR lacks satellite navigation system coordinates identifying a geographic location of the UE (112); and
- responsive to determining that the incomplete MR lacks the satellite navigation system coordinates, predicting (508) the geographic location of the UE (112) based on measurements comprised in the incomplete MR and the ML model.

Embodiment 9: A computing node (114) for geolocating MDT MRs with missing satellite navigation system coordinates, the computing node comprising:
a network interface (1104); and
processing circuitry (1100) adapted to cause the computing node (114) to:
- receive (400) a plurality of complete MRs corresponding to a plurality of UEs (112), wherein each complete MR of the plurality of complete MRs comprises satellite navigation system coordinates identifying a geographic location of a corresponding UE (112) of the plurality of UEs (112); and
- train (412) an ML model for estimating UE geographic locations based on the plurality of complete MRs, where the ML model maps a plurality of RF signatures of the plurality of complete MRs to corresponding UE geographic locations Embodiment 10: The computing node (114) of embodiment 9, wherein the processing circuitry (1100) is adapted to cause the computing node (114) to perform the method of any one of embodiments 2 to 6.

Embodiment 11: A method performed by a radio access node (102) for a RAN (200) of a cellular communications system (100) to geolocate MDT MRs with missing satellite navigation system coordinates, the method comprising:
- obtaining (500) an ML model for estimating UE geographic locations based on measurements comprised in an MR;
- receiving (504) an incomplete MR corresponding to a UE (112);
- determining (506) that the incomplete MR lacks satellite navigation system coordinates identifying a geographic location of the UE (112); and
- responsive to determining that the incomplete MR lacks the satellite navigation system coordinates, predicting (508) the geographic location of the UE (112) based on measurements comprised in the incomplete MR and the ML model.

Embodiment 12: The method of embodiment 11, wherein obtaining (500) the ML model for estimating UE geographic locations comprises receiving the ML model from a computing node (114).

Embodiment 13: The method of embodiment 11, wherein obtaining (500) the ML model for estimating UE geographic locations comprises:
- receiving (400) a plurality of complete MRs corresponding to a plurality of UEs (112), wherein each complete MR of the plurality of complete MRs comprises satellite navigation system coordinates identifying a geographic location of a corresponding UE (112) of the plurality of UEs (112); and training (412) the ML model for estimating UE geographic locations based on the plurality of complete MRs, wherein the ML model maps a plurality of RF signatures of the plurality of complete MRs to corresponding UE geographic locations.

Embodiment 14: The method of embodiment 13, wherein:

the plurality of complete MRs each further comprises:
- a serving cell identifier for a serving cell (104, 108) of the corresponding UE (112);
- an RSRP measurement for the serving cell (104, 108) of the corresponding UE (112); and
- one or more non-serving cell identifiers and corresponding RSRPs for a corresponding one or more non-serving cells (104, 108) measured simultaneously with the serving cell (104, 108) of the corresponding UE (112); and training (412) the ML model is further based on the serving cell identifier, the RSRP measurement, and the one or more non-serving cell identifiers and the corresponding RSRPs within each complete MR of the plurality of complete MRs.

Embodiment 15: The method of embodiment 13, wherein:

the plurality of complete MRs each further comprises a TA parameter indicating an estimated distance between the corresponding UE (112) and the serving cell (104, 108) of the corresponding UE (112); and training (412) the ML model is further based on the estimated distance between the corresponding UE (112) and the serving cell (104, 108) of the corresponding UE (112) indicated by the TA parameter of each complete MR of the plurality of complete MRs.

Embodiment 16: The method of embodiment 13, wherein:

the plurality of complete MRs each further comprises a timestamp and a call identifier; and training (412) the ML model is further based on excluding geolocations based on the timestamp and the call identifier of each complete MR of the plurality of complete MRs.

Embodiment 17: The method of embodiment 13, wherein the ML model is based on one or more of a non-linear regression algorithm, a regression tree, and a neural network.

Embodiment 18: The method of embodiment 13, wherein each complete MR of the plurality of complete MRs comprises an MDT M1 report.

Embodiment 19: A radio access node (102) for a RAN (200) of a cellular communications system (100) to geolocate MDT MRs with missing satellite navigation system coordinates, the radio access node (102) adapted to:
- obtain (500) an ML model for estimating UE geographic locations based on measurements comprised in an MR;
- receive (504) an incomplete MR corresponding to a UE (112);
- determine (506) that the incomplete MR lacks satellite navigation system coordinates identifying a geographic location of the UE (112); and
- responsive to determining that the incomplete MR lacks the satellite navigation system coordinates, predict (508) the geographic location of the UE (112) based on measurements comprised in the incomplete MR and the ML model.

Embodiment 20: The radio access node (102) of embodiment 19, wherein the radio access node (102) is further adapted to perform the method of any one of embodiments 12 to 18.

Embodiment 21: A radio access node (102) for a RAN (200) of a cellular communications system (100) enabled to geolocate MDT MRs with missing satellite navigation system coordinates, the radio access node (102) comprising:
- a network interface (600); and
- processing circuitry (604) associated with the network interface (600), the processing circuitry (604) adapted to cause the radio access node to:
  - obtain (500) an ML model for estimating UE (112) geographic locations based on measurements comprised in an MR;
  - receive (504) an incomplete MR corresponding to a UE (112);
  - determine (506) that the incomplete MR lacks satellite navigation system coordinates identifying a geographic location of the UE (112); and
  - responsive to determining that the incomplete MR lacks the satellite navigation system coordinates, predict (508) the geographic location of the UE based on measurements comprised in the incomplete MR and the ML model.

Embodiment 22: The radio access node (102) of embodiment 21, wherein the processing circuitry (604) is adapted to cause the radio access node (102) to perform the method of any one of claims 12 to 18.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
AF Application Function
AMF Access and Mobility Management Function
AOA Angle of Arrival
ASIC Application Specific Integrated Circuit
AUSF Authentication Server Function
BDS BeiDou Navigation Satellite System
CPU Central Processing Unit
DN Data Network
DSP Digital Signal Processor
eNB Enhanced or Evolved Node B
FPGA Field Programmable Gate Array
FDOA Frequency Difference of Arrival
GLONASS Global Navigation Satellite System
gNB New Radio Base Station
GPS Global Positioning Satellite
HSS Home Subscriber Server
iOS iPhone Operating System
IP Internet Protocol
IRNSS Indian Regional Navigation Satellite System
LTE Long Term Evolution
MDT Minimization of Drive Tests
ML Machine Learning
MME Mobility Management Entity
MR Measurement Report
MTC Machine Type Communication
NEF Network Exposure Function
NF Network Function
NR New Radio
NRF Network Function Repository Function
NSSF Network Slice Selection Function
OSS Operations Support System
PCF Policy Control Function
PCI Physical Cell Identifier
P-GW Packet Data Network Gateway
QoS Quality of Service QZSS Quasi-Zenith Satellite System
RAM Random Access Memory
RAN Radio Access Network
RF Radio Frequency
ROM Read Only Memory
RRC Radio Resource Control
RRH Remote Radio Head
RSRP Reference Signal Received Power
RSRQ Reference Signal Received Quality
RSSI Received Signal-Strength Indication
RTT Round Trip Time
SCEF Service Capability Exposure Function
SMF Session Management Function
TA Timing Advance
TDOA Time Difference of Arrival
UE User Equipment
UDM Unified Data Management
UMTS Universal Mobile Telecommunications System
UPF User Plane Function
VMM Virtual Machine Monitor Those skilled in the art will recognize improvements and modifications to the embodiments of the present disclosure. All such improvements and modifications are considered within the scope of the concepts disclosed herein.

What is claimed is:

1. A method for geolocating Minimization of Drive Test, MDT, measurement reports, MRs, with missing satellite navigation system coordinates, the method comprising, at a computing node:
   receiving a plurality of complete MRs corresponding to a plurality of user equipments, UEs, wherein each complete MR of the plurality of complete MRs comprises satellite navigation system coordinates identifying a geographic location of a corresponding UE of the plurality of UEs; and
   training a machine learning, ML, model for estimating UE geographic locations based on the plurality of complete MRs, wherein the ML model maps a plurality of radio frequency, RF, signatures of the plurality of complete MRs to corresponding UE geographic locations.

2. The method of claim 1, wherein each RF signature of the plurality of RF signatures comprise one or more measurements comprised in a complete MR of the plurality of complete MRs.

3. The method of claim 1, wherein:
   the plurality of complete MRs each further comprises:
      a serving cell identifier for a serving cell of the corresponding UE;
      a Reference Signal Received Power, RSRP, measurement for the serving cell of the corresponding UE; and
      one or more non-serving cell identifiers and corresponding RSRPs for a corresponding one or more non-serving cells measured simultaneously with the serving cell of the corresponding UE; and
   training the ML model is further based on the serving cell identifier, the RSRP measurement, and the one or more non-serving cell identifiers and the corresponding RSRPs of each complete MR of the plurality of complete MRS.

4. The method of claim 1, wherein:
   the plurality of complete MRs each further comprises a timing advance, TA, parameter indicating an estimated distance between the corresponding UE and the serving cell of the corresponding UE; and
   training the ML model is further based on the estimated distance between the corresponding UE and the serving cell of the corresponding UE indicated by the TA parameter of each complete MR of the plurality of complete MRs.

5. The method of claim 1, wherein:
   the plurality of complete MRs each further comprises a timestamp and a call identifier; and
   training the ML model is further based on excluding geolocations based on the timestamp and the call identifier of each complete MR of the plurality of complete MRs.

6. The method of claim 1, wherein the ML model is based on one or more of a non-linear regression algorithm, a regression tree, and a neural network.

7. The method of claim 1, wherein each complete MR of the plurality of complete MRs comprises an MDT M1 report.

8. The method of claim 1, further comprising, at a radio access node for a Radio Access Network, RAN, of a cellular communications system:
   obtaining the ML model from the computing node;
   receiving an incomplete MR corresponding to a UE;
   determining that the incomplete MR lacks satellite navigation system coordinates identifying a geographic location of the UE; and
   responsive to determining that the incomplete MR lacks the satellite navigation system coordinates, predicting the geographic location of the UE based on measurements comprised in the incomplete MR and the ML model.

9. A computing node for geolocating Minimization of Drive Test, MDT, measurement reports, MRs, with missing satellite navigation system coordinates, the computing node comprising:
   a network interface; and
   processing circuitry adapted to cause the computing node to:
      receive a plurality of complete MRs corresponding to a plurality of user equipments, UEs, wherein each complete MR of the plurality of complete MRs comprises satellite navigation system coordinates identifying a geographic location of a corresponding UE of the plurality of UEs; and
      train a machine learning, ML, model for estimating UE geographic locations based on the plurality of complete MRs, wherein the ML model maps a plurality of radio frequency, RF, signatures of the plurality of complete MRs to corresponding UE geographic locations.

10. A method performed by a radio access node for a Radio Access Network, RAN, of a cellular communications system to geolocate Minimization of Drive Test, MDT, measurement reports, MRs, with missing satellite navigation system coordinates, the method comprising:
   obtaining a machine learning, ML, model for estimating user equipment, UE, geographic locations based on measurements comprised in an MR;
   receiving an incomplete MR corresponding to a UE;
   determining that the incomplete MR lacks satellite navigation system coordinates identifying a geographic location of the UE; and
   responsive to determining that the incomplete MR lacks the satellite navigation system coordinates, predicting the geographic location of the UE based on measurements comprised in the incomplete MR and the ML model.

11. The method of claim 10, wherein obtaining the ML model for estimating UE geographic locations comprises receiving the ML model from a computing node.

12. The method of claim 10, wherein obtaining the ML model for estimating UE geographic locations comprises:
    receiving a plurality of complete MRs corresponding to a plurality of UEs, wherein each complete MR of the plurality of complete MRs comprises satellite navigation system coordinates identifying a geographic location of a corresponding UE of the plurality of UEs; and
    training the ML model for estimating UE geographic locations based on the plurality of complete MRs, wherein the ML model maps a plurality of radio frequency, RF, signatures of the plurality of complete MRs to corresponding UE geographic locations.

13. The method of claim 12, wherein:
    the plurality of complete MRs each further comprises:
        a serving cell identifier for a serving cell of the corresponding UE;
        a Reference Signal Received Power, RSRP, measurement for the serving cell of the corresponding UE; and
        one or more non-serving cell identifiers and corresponding RSRPs for a corresponding one or more non-serving cells measured simultaneously with the serving cell of the corresponding UE; and
    training the ML model is further based on the serving cell identifier, the RSRP measurement, and the one or more non-serving cell identifiers and the corresponding RSRPs of each complete MR of the plurality of complete MRs.

14. The method of claim 12, wherein:
    the plurality of complete MRs each further comprises a timing advance, TA, parameter indicating an estimated distance between the corresponding UE and the serving cell of the corresponding UE; and
    training the ML model is further based on the estimated distance between the corresponding UE and the serving cell of the corresponding UE indicated by the TA parameter of each complete MR of the plurality of complete MRs.

15. The method of claim 12, wherein:
    the plurality of complete MRs each further comprises a timestamp and a call identifier; and
    training the ML model is further based on excluding geolocations based on the timestamp and the call identifier of each complete MR of the plurality of complete MRs.

16. The method of claim 12, wherein the ML model is based on one or more of a non-linear regression algorithm, a regression tree, and a neural network.

17. The method of claim 12, wherein each complete MR of the plurality of complete MRs comprises an MDT M1 report.

18. A radio access node for a radio access network, RAN, of a cellular communications system enabled to geolocate Minimization of Drive Test, MDT, measurement reports, MRs, with missing satellite navigation system coordinates, the radio access node comprising:
    a network interface; and
    processing circuitry associated with the network interface, the processing circuitry adapted to cause the radio access node to:
        obtain a machine learning, ML, model for estimating user equipment, UE, geographic locations based on measurements comprised in an MR;
        receive an incomplete MR corresponding to a UE;
        determine that the incomplete MR lacks satellite navigation system coordinates identifying a geographic location of the UE; and
        responsive to determining that the incomplete MR lacks the satellite navigation system coordinates, predict the geographic location of the UE based on measurements comprised in the incomplete MR and the ML model.

* * * * *